United States Patent Office 3,375,228
Patented Mar. 26, 1968

3,375,228
HOT CAPPING OF POLYPHENYLENE ETHERS
Klaus E. Holoch and Bernadus J. Van Sorge, Pittsfield, Mass., assignors to General Electric Company, a corporation of New York
No Drawing. Continuation-in-part of application Ser. No. 425,330, Jan. 13, 1965. This application May 10, 1967, Ser. No. 637,325
25 Claims. (Cl. 260—47)

ABSTRACT OF THE DISCLOSURE

A polyphenylene ether stabilized by a process involving heat treatment of the polymer to generate incipient, reactive, hydroxyl groups on the polymer chain followed by reaction of generated hydroxyl groups with a material capable of reacting therewith to form substituents on the polymer chain inert to oxygen attack at elevated temperatures.

---

This is a continuation-in-part of copending United States patent application Ser. No. 425,330, filed Jan. 13, 1965.

This invention relates to polyphenylene ether plastics, and more particularly, to the stabilization of such plastics by a process involving the generation of incipient hydroxyl groups on the polymer chain followed by reaction of generated hydroxyl groups with a material capable of reacting therewith to form substituents substantially inert to oxygen attack at elevated temperatures.

The term "polyphenylene ether," as used herein, includes those polymers disclosed and claimed in copending U.S. patents of Allan S. Hay, Nos. 3,306,874 and 3,306,875; the polymers disclosed and claimed in U.S. Patents Nos. 3,257,357 and 3,257,358 of Gelu Stoeff Stamatoff (all incorporated herein by reference), and the various copolymers and blends of the polyphenylene ethers formed by copolymerizing or blending the polyphenylene ethers with other monomers or polymers such as the polyolefins, polystyrenes and their alloys, polycarbonates, and the like, wherein the polyphenylene ether is present in an amount sufficient to significantly affect the properties of the polymer composition due to the influence of heat and light.

It is known that the polyphenylene ethers, and particularly the 2,6-dialkyl substituted polyphenylene ethers, are somewhat unstable under the influence of heat and oxygen containing atmospheres causing the resin to become dark colored, brittle and undesirable for many uses. The cause of the degradation is not fully understood, but it is believed to be due to a large extent, to the susceptibility of hydroxyl groups on the polymer chain to attack by oxygen containing atmospheres at elevated temperatures.

Heretofore, a large number of different antioxidants such as the phenolic antioxidants exemplified by p-phenylphenol N-steroyl-p-amine phenol, and 2,2'-methylenebis(4-ethyl-6-tert-butylphenol) have been used as heat and light stabilizers for the polyphenylene ether compositions. These stabilizers have been generally found to be unsatisfactory for even short exposure. In addition, as disclosed in copending U.S. patent application, Ser. No. 570,947, of Anderson et al., filed Aug. 8, 1966, attempts have been made to stabilize the polyphenylene ethers by reacting the terminal hydroxyl groups thereof with a material such as ketene to form a substituent that is inert to oxygen containing atmospheres at elevated temperatures. This method of stabilization is effective for short periods of exposure, but not for the relatively long exposures required for many commercial applications.

If the polyphenylene ethers could be formed without irregularities or side reactions, each polymer chain would be linear and terminated at one end with a -4-aryloxy unit of the formula:

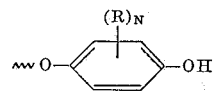

wherein R represents a substituent as disclosed in the above-noted Hay and Stamatoff patents; and $n$ is equal to the number of replaceable hydrogens on the aryl nucleus. It would therefore be expected that each polymer chain would have an average of one hydroxyl group located on the terminal portion of the polymer chain. It has now been found, however, that while the low molecular weight polyphenylene ethers, i.e., those polymers having molecular weights of less than 3,000 do have an average of approximately one hydroxyl group per chain, as the molecular weight of the polymer increases above 3000, the average hydroxyl content of the polymer drops below one per polymer chain. Those polymers of intermediate to high molecular weight used commercially, i.e., those polymers having molecular weight in excess of 10,000, have been found to contain an average of about 0.2 to 0.6 hydroxyl groups per polymer chain. It has also been found that heating of the polymer generates hydroxyl groups causing the average number of hydroxyl groups per polymer chain to increase to a maximum of about one, dependent upon the temperature and duration of exposure. The mechanism by which the hydroxyl groups are generated is not fully understood, but is possibly due to the formation of abnormal terminal groups with subsequent decomposition and formation of hydroxyl groups at elevated temperatures. Due to the manner in which these hydroxyl groups are formed, they will hereinafter be referred to as "incipient hydroxyl groups."

The procedure heretofore used to stabilize the polyphenylene ethers involving the reaction of hydroxyl groups with a material reactive therewith to form inert substituents has met only limited success because incipient hydroxyl groups are generated after reaction by the processing of the polymer at elevated temperatures into useful shapes using conventional techniques such as molding, vacuum forming, extrusion, etc. These groups are then subject to oxidative attack resulting in discoloration and embrittlement of the polymer.

According to the process of the present invention, the polymer is first heat treated to generate incipient hydroxyl groups and thereafter, reacted with a material capable of reacting with the hydroxyl groups to form a substituent substantially inert to oxygen containing atmospheres. Consequently, hydroxyl groups will not be generated during processing operations and the polymer will be more resistant to oxidative attack, thus avoiding discoloration and embrittlement.

Accordingly, an object of this invention is to provide a polyphenylene ether stable to oxidative attack. Another object of this invention is to provide a process for preparation of a stabilized polyphenylene ether. Other objects and advantages of this invention will be in part apparent and in part pointed out in the description which follows.

For brevity throughout the remainder of this specification the reaction of the hydroxyl groups on the polymer with a material reactive therewith will be referred to as "capping"; the same reaction preceded by or performed simultaneously with a heat treatment step will be referred to as "hot capping" and the material to be reacted with the hydroxyl group will be referred to as the "capping agent."

The polyphenylene ethers can be stabilized by the process of this invention using either a one-step or a two-step hot capping procedure. In the one step process, a solution is prepared by dissolving both the polymer and a capping agent in a mutual solvent such as toluene, benzene, or any other liquid non-reactive with the polymer and capping agent. The solution is heated to an elevated temperature, preferably to temperatures in excess of 250° F. and most preferably, to temperatures varying between 400 and 650° F. Heating may be performed in an autoclave using pressures exceeding atmospheric. The temperature is held for a period of time sufficient to allow all the incipient hydroxyl groups to be generated. This is, of course, dependent upon the temperature used and the reactivity of the materials. In general times varying between 30 seconds and 2 hours have been found suitable. Hydroxyl groups are generated at the elevated temperature and simultaneously react with capping agent to form substituents substantially inert to attack from oxygen containing atmospheres. Upon completion of the hot capping reaction, the solution is cooled and the polymer recovered by precipitation with a polymer non-solvent such as methanol.

Alternatively, the one-step hot capping reaction can be carried out dry by blending polymer in powder form with a capping agent and extruding the blend at the elevated temperatures.

The two-step hot capping procedure is similar to the one-step process and involves a first step of pre-heating the polymer, either in powder or solution form to generate hydroxyl groups in accordance with the procedure outlined above. The polymer may then be cooled and reacted with the capping agent, at ambient or elevated temperatures to stabilize the polymer. At lower temperatures, it is desirable to use a catalyst such as boron trifluoride etherate, sodium acetate or a tertiary amine.

The specific capping agents used are not critical providing they are reactive with hydroxyl groups to form a substituent inert to oxygen containing atmospheres. Typical examples of capping agents include acid halides, anhydrides, ketenes, etc. Typical examples of acid halides include, but are not limited to, acetyl chloride, acetyl bromide, benzoyl chloride, cinnamoyl chloride, succinoyl chloride, succinoyl fluoride, adipoyl chloride, steroyl fluoride, lauroyl chloride, malonoyl chloride, terephthaloyl chloride, isophthaloyl chloride, etc. Typical examples of anhydrides, include for example, maleic anhydride, butyric anhydride, trichloroacetic anhydride, propionic anhydride, pivalic anhydride, phthalic anhydride, succinic anhydride, m-dichlorobenzoic anhydride, 2,3,4,5,6-pentachlorobenzoic anhydride, pentaoic anhydride, palmatoic anhydride, steric anhydride, etc. Typical ketenes include, for example, diphenyl ketene, unsubituted ketene, butyl ethylketene, dimethyl ketene, etc.

The following examples serve to illustrate the invention, but are not intended to limit it thereto, the parts being by weight unless otherwise stated.

Example 1

This example illustrates how the hydroxyl content of an untreated polyphenylene ether is increased during conventional molding processes.

A sample of a poly-(2,6-dimethyl-1,4-phenylene)-ether having an intrinsic viscosity of 0.53 deciliters per gram (dl./g.) as measured in chloroform at 25° C. was molded into a film by preheating the powder to 550° F. for 1 minute, pressing the film at 550° F. for 2 minutes, and thereafter allowing the film to cool in air. The hydroxyl content of the polyphenylene ether powder prior to molding into film was 0.034% or an average of 0.49 OH groups per polymer chain. By hot pressing the powder into film, the hydroxyl content was increased to 0.052% or an average 1.03-OH groups per chain. This amounts to a hydroxyl content increase of 0.018% or 0.54 hydroxyl groups per chain.

Examples 2–4

The procedure of Example 1 was repeated three times using polymers of differing initial hydroxyl contents with the following results:

| Example No. | Wt. percent—OH | | | —OH per chain | | |
|---|---|---|---|---|---|---|
| | Powder | Film | Δ—OH | Powder | Film | Δ—OH |
| 2 | 0.033 | 0.050 | 0.017 | 0.47 | 0.99 | 0.52 |
| 3 | 0.059 | 0.082 | 0.023 | 0.58 | 0.97 | 0.39 |
| 4 | 0.022 | 0.046 | 0.024 | 0.34 | 1.07 | 0.73 |

In each case, hydroxyl content increased greatly during the molding operation. Also, in each case, the final hydroxyl content was found to be an average of approximately one per polymer chain.

Example 5

This example illustrates how the hydroxyl content of a capped polyphenylene ether, without prior heat treatment, is increased during conventional molding processes.

The polymer of Example 1 was dissolved in toluene to form a solution containing 10% solids. Four percent acetic anhydride and 8% boron trifluoride etherate catalyst were added to cap the polymer at room temperature. Thereafter, the polymer was recovered by adding sufficient quantity of methanol to precipitate the polymer. The hydroxyl content of the capped polymer was found to be 0.010% or 0.13 hydroxyl units per polymer chain. Thereafter, using the procedure set forth in Example 1, the powder was molded into films. The hydroxyl content of the film was found to be 0.034% for an increase of 0.024% or, an average of 0.65 hydroxyl groups per chain for an average increase of 0.52 hydroxyl groups per chain.

Examples 6–8

The procedure of Example 5 was repeated three additional times using polymers with differing initial hydroxyl contents with the following results:

| Example No. | Wt. percent—OH | | | —OH per chain | | |
|---|---|---|---|---|---|---|
| | Powder | Film | Δ—OH | Powder | Film | Δ—OH |
| 6 | 0.008 | 0.031 | 0.023 | 0.11 | 0.64 | 0.52 |
| 7 | 0.010 | 0.039 | 0.029 | 0.10 | 0.45 | 0.35 |
| 8 | 0.008 | 0.041 | 0.033 | 0.12 | 0.97 | 0.84 |

The hydroxyl content of the polymer increased sharply, in each case due to the influence of heat during the molding operation. The presence of the hydroxyl groups on the polymer chain would cause the polymer to degrade at elevated temperatures in oxygen containing atmospheres with corresponding embrittlement and discoloration.

Examples 9–19

Using the procedure of Example 5, the polymer was capped using various capping agents. In addition, the molded films were aged at 175° C. in air to determine the effect of the hydroxyl content on the stability of the polymer. Time to embrittle was used as a measure of stability. This is determined by measuring the time at elevated temperature necessary to cause a polymer film sample to fracture with one fold. The capping agents, hydroxyl content and embrittlement data are set forth in the following table:

| Example No. | Capping Agent | Wt. Percent —OH | | | Time to embrittle at 75° F. (hrs.) |
|---|---|---|---|---|---|
| | | Powder | Film | Δ—OH | |
| 9 | Control (no additive) | 0.049 | 0.079 | 0.030 | 30 |
| 10 | Acetic anhydride | 0.009 | 0.031 | 0.022 | 50 |
| 11 | Acetyl chloride | 0.008 | 0.026 | 0.018 | 45 |
| 12 | Benzolyl chloride | 0.010 | 0.022 | 0.012 | 54 |
| 13 | 2-ethylhexanoyl chloride | 0.008 | 0.019 | 0.011 | 60 |
| 14 | Ketene | 0.009 | 0.030 | 0.021 | 45 |
| 15 | Butylethylketene | 0.009 | 0.020 | 0.013 | 55 |
| 16 | Acetic anhydride | 0.008 | 0.035 | 0.027 | 57 |
| 17 | Cinnamoyl chloride | 0.008 | 0.020 | 0.012 | 55 |
| 18 | Terephthaloyl chloride | 0.007 | 0.025 | 0.018 | 48 |
| 19 | Propionyl chloride | 0.008 | 0.023 | 0.015 | 54 |

The capping agent significantly reduces the hydroxyl content. However, when the polymer is molded into a film, the hydroxyl content increases substantially, through not to a level equivalent to the uncapped control sample. In most cases, the time to embrittle is lower for polymers with greater hydroxyl content.

*Example 20*

This example illustrates the pretreatment of step of heating the polymer prior to capping and how this procedure increases the hydroxyl content of the polymer.

Fifty grams of a poly-(2,6-dimethyl-1,4-phenylene) ether were dissolved in 500 ml. of toluene. One hundred ml. of this solution were treated with methanol to precipitate the polymer. This polymer was used as a control. The remainder of the solution was heated in an autoclave at 445° F. for 30 minutes. After cooling, the polymer was precipitated with methanol. The hydroxyl content of the control was found to be 0.025% or an average of 0.45 hydroxyl groups per chain. The sample subjected to autoclaving was found to have a hydroxyl content of 0.034% or 0.94 hydroxyl groups per chain. It can be seen that autoclaving results in an increase in hydroxyl content similar to the increase encountered in hot molding.

*Example 21*

This example illustrates the one-step hot capping procedure of this invention.

Fifty grams of the untreated polymer of Example 9 were dissolved in 500 mls. of toluene. Approximately 50 mls. of acetic anhydride were added to this solution. The mixture was heated in an autoclave at 445° F. for 30 minutes. After cooling, the polymer was recovered with methanol. Hydroxyl content was found to be 0.008% or 0.14 units per polymer chain. This compares with 0.94 hydroxyl groups per polymer chain for uncapped, autoclaved polymers.

*Example 22*

In this example, 50 grams of the untreated polymer of Example 9 were dissolved in 500 mls. of toluene. Five mls. of demineralized water were added to the solution. The mixture was heated at 445° F. for 30 minutes. The solution was then allowed to cool and part of the solution was treated with methanol to precipitate the polymer. This polymer was used as a control. The remainder of the solution was mixed with an excess of acetic anhydride and 2 mls. of boron trifluoride etherate as catalyst. The mixture was refluxed under nitrogen for 30 minutes.

After cooling, 100 mls. of demineralized water were added and two separate layers formed. The organic layer was separated by centrifuging. Polymer was recovered by precipitation with methanol. The hydroxyl content of the uncapped control was found to be 0.033% or 0.80 hydroxyl groups per polymer chain. The capped material was found to have a hydroxyl content of 0.007% or 0.18 hydroxyl groups per chain.

*Example 23*

This example illustrates the susceptibility of polyphenylene ethers containing a large hydroxyl content to oxygen attack at elevated temperatures.

Fifty grams of a poly-(2,6-dimethyl-1,4-phenylene) ether were dissolved in 500 mls. of toluene. The solution was divided into two parts. Polymer from the first solution was precipitated with methanol, dried and molded into a film at 550° F. The second portion of the solution was mixed with 25 mls. of acetic anhydride. The mixture was heated in an autoclave at 445° F. for 30 minutes. After cooling, the polymer was precipitated with methanol and molded into films at 550° F. The first film had a hydroxyl content of 0.072 or 0.42 hydroxyl groups per polymer chain. The film formed from the capped polymer had a hydroxyl content of 0.008% or 0.14 hydroxyl groups per chain. Both films were subjected to thermal aging in air at 175° C. Embrittlement occurred between 40 and 50 hours for the uncapped sample and between 140 and 150 hours for the capped sample.

*Examples 24–33*

The procedure of Example 23 was repeated using different capping agents with the following results:

| Example No. | Capping Agent | Wt. percent—OH | | | Time to embrittlement at 175° C. (hrs.) |
|---|---|---|---|---|---|
| | | Powder | Film | Δ—OH | |
| 24 | Control (no additives) | 0.042 | 0.072 | 0.030 | 45 |
| 25 | Acetic anhydride | 0.005 | 0.008 | 0.003 | 180 |
| 26 | Benzoic anhydride | 0.009 | 0.012 | 0.003 | 226 |
| 27 | Glacial acetic acid* | 0.009 | 0.012 | 0.003 | 215 |
| 28 | Propionyl chloride | 0.008 | 0.010 | 0.002 | 85 |
| 29 | Butyryl chloride | 0.008 | 0.011 | 0.003 | 75 |
| 30 | 2-ethylhexanoyl chloride | 0.008 | 0.009 | 0.001 | 70 |
| 31 | Dodecyl chloride | 0.009 | 0.013 | 0.004 | 90 |
| 32 | Cinnamoyl chloride | 0.008 | 0.010 | 0.002 | 75 |
| 33 | Terephthaloyl chloride | 0.008 | 0.011 | 0.003 | 110 |

*May acetylate directly or for anhydride as intermediate under reaction conditions.

It should, of course be understood that the invention is susceptible to further modification within the scope of the appended claims.

What we claim as new and desire to secure by Letters Patent of the United States is:

1. In a process for the stabilization of a polyphenylene ether comprising the step of reacting a hydroxyl group on the polymer chain with a material reactive therewith to form a substituent inert to oxygen containing atmospheres at elevated temperatures, the improvement comprising the step of heat treating the polymer at an elevated temperature for a time sufficient to generate incipient hydroxyl groups prior to or simultaneously with the reaction of the hydroxyl groups with said reactive material.

2. The process of claim 1 where the heat treatment is at a temperature of at least 250° F. for a time sufficient to raise the number of hydroxyl groups in the polymer to an average of approximately one hydroxyl group per polymer chain.

3. The process of claim 1 wherein the polyphenylene ether is poly-(2,6-dimethyl-1,4-phenylene) ether.

4. The process of claim 3 where the heat treatment is at a temperature of between 400° F. and 650° F. for a time sufficient to raise the hydroxyl content of the polymer to an average of approximately one hydroxyl group per polymer chain.

5. The process of claim 3 where the polymer is heat treated and the hydroxyl groups are subsequently reacted with a material capable of reacting therewith to form a substituent inert to oxygen containing atmospheres.

6. The process of claim 5 where the polymer is heat treated in powder form and then reacted in solution with a material capable of reacting therewith to form a substituent inert to oxygen containing atmospheres.

7. The process of claim 3 where the polymer is simultaneously heat treated and the hydroxyl groups are reacted with a material capable of reacting therewith to form a substituent inert to oxygen containing atmospheres.

8. The process of claim 7 where the heat treatment step is performed in solution.

9. The process of claim 3 where the material reactive with hydroxyl groups is an anhydride.

10. The process of claim 9 where the material is acetic anhydride.

11. The process of claim 3 where the material reactive with hydroxyl groups is a ketene.

12. The process of claim 11 where the material is unsubstituted ketene.

13. The process of claim 11 where the material is butyl ethyl ketene.

14. The process of claim 3 where the material reactive with hydroxyl groups is an acid halide.

15. The process of claim 14 where the material is acetyl chloride.

16. The process of claim 3 where the material is glacial acetic acid.

17. A polyphenylene ether stable to oxygen containing atmospheres at elevated temperature prepared by the process of claim 1.

18. A poly-(2,6-dimethyl-1,4-phenylene) ether stable to oxygen containing atmospheres at elevated temperature prepared by the process of claim 1.

19. A polyphenylene ether stable to oxygen containing atmospheres at elevated temperature that is the reaction product of the polymer of claim 18 and an acid anhydride.

20. The polyphenylene ether of claim 19 wherein the acid anhydride is actic anhydride.

21. A polyphenylene ether stable to oxygen containing atmospheres at elevated temperatures that is the reaction product of the polymer of claim 18 and a ketene.

22. The polyphenylene ether of claim 21 where the ketene is unsubstituted ketene.

23. The polyphenylene ether of claim 21 where the ketene is butyl ethyl ketene.

24. A polyphenylene ether stable to oxygen containing atmospheres at elevated temperatures that is the reaction product of the polymer of claim 18 and an acid halide.

25. The polyphenylene ether of claim 24 where the acid halide is acetyl chloride.

No references cited.

WILLIAM H. SHORT, *Primary Examiner.*

M. GOLDSTEIN, *Assistant Examiner.*